UNITED STATES PATENT OFFICE.

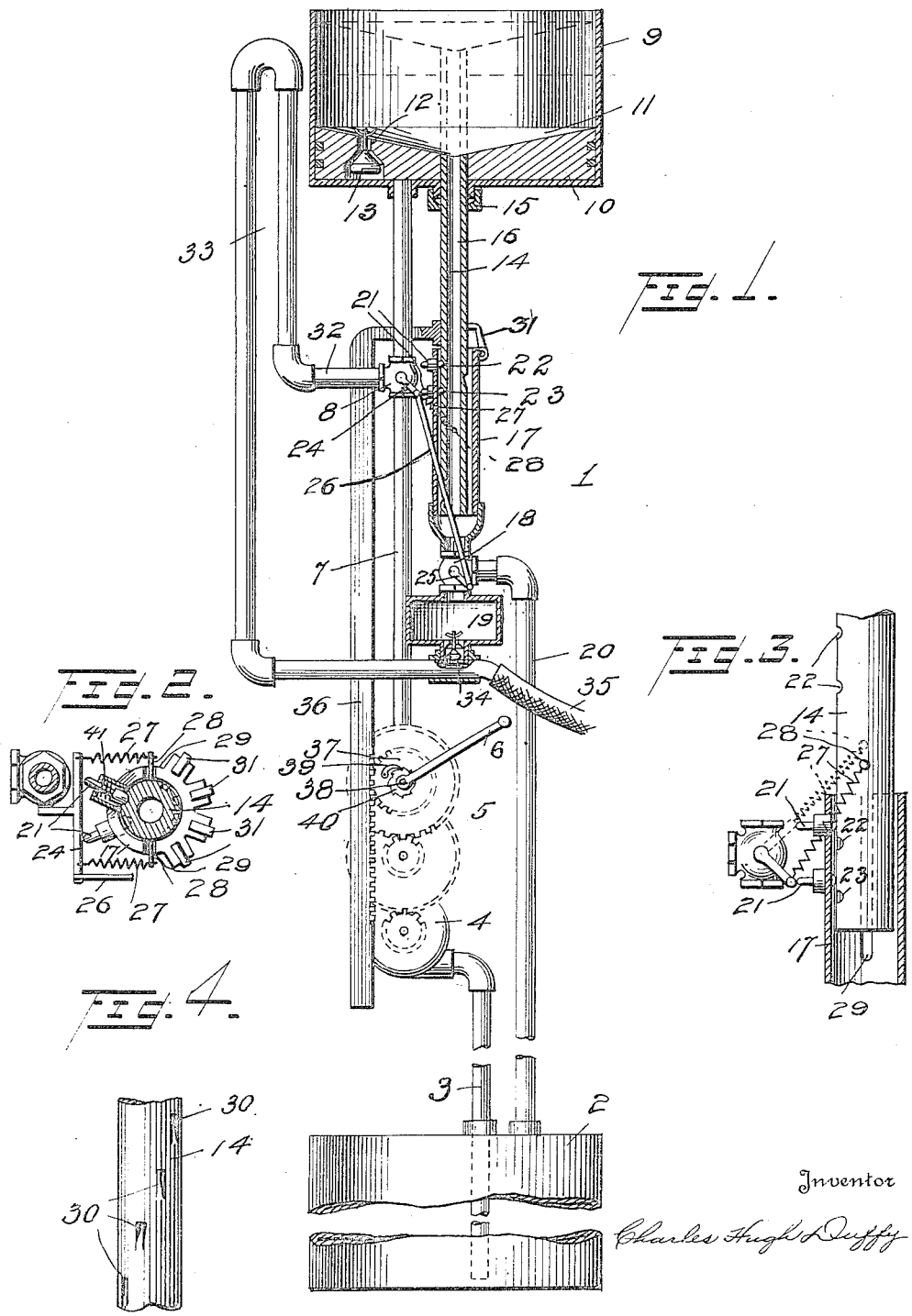

CHARLES HUGH DUFFY, OF CHEVY CHASE, MARYLAND, ASSIGNOR OF TWO-THIRDS TO WALTER J. COSTELLO AND J. CHARLES McGUIRE, BOTH OF WASHINGTON, DISTRICT OF COLUMBIA.

GASOLENE-MEASURING APPARATUS.

1,276,502.        Specification of Letters Patent.     Patented Aug. 20, 1918.

Application filed February 7, 1917. Serial No. 147,131.

*To all whom it may concern:*

Be it known that I, CHARLES HUGH DUFFY, a citizen of the United States, residing at Chevy Chase, in the county of Montgomery and State of Maryland, have invented certain new and useful Improvements in Gasolene-Measuring Apparatus; and I do declare the following to be a full, clear, and exact description of the invention, such as will enable others skilled in the art to which it appertains to make and use the same, reference being had to the accompanying drawings, and to the letters and figures of reference marked thereon, which form part of this specification.

This invention relates to liquid measuring apparatus, but more particularly to apparatus designed for the measuring of gasolene, and the invention has for its object to provide a gasolene measuring apparatus in which the pump or other liquid lifting device does not measure or assist in measuring the quantity of liquid discharged from the machine.

A further object of the invention is to provide an apparatus so constructed and arranged that no liquid can be dispensed therefrom until a certain definite and predetermined quantity has been fed thereto.

A further object of the invention is to provide a liquid measuring and dispensing apparatus in which the alternate filling and emptying of the measuring tank is automatically controlled so as not to be under the manual control of the operator or vender.

With these and other objects in view the invention consists in the novel construction and arrangement of the parts and particularly in the arrangement and construction of the liquid receiving and measuring tank and its coacting parts, so that the quantity of liquid fed to the measuring tank is automatically controlled to such an extent that short stroking of the measuring apparatus is eliminated and to such an extent that the full quantity of liquid is fed to the measuring tank and dispensed therefrom without regard of the intentions of the operator or vender.

The invention further consists in the novel construction and arrangement of the parts which provide for the returning of leakage under one condition to the operator or vender, and which provides for the dispensing of the leakage under another condition to the purchaser.

The invention further consists in the novel construction and arrangement of the parts for automatically controlling the amount of liquid fed to the measuring tank and for automatically controlling the stroke of the piston in the measuring tank.

The invention further consists in certain other novel details of construction and in certain combinations of parts, all of which will be first fully described and afterward specifically pointed out in the appended claims.

Referring to the accompanying drawing—

Figure 1 is a view partly in elevation and partly in section of a liquid measuring apparatus constructed in accordance with this invention.

Fig. 2 is an enlarged horizontal sectional view taken on the hollow piston and feed pipe, the rack bar being removed, and one of the locking plunger housings being shown in section in order to facilitate the illustration.

Fig. 3 is an enlarged vertical sectional view of the casing, the piston rod being shown in elevation and broken away, and Fig. 4 is an enlarged fragmentary elevation of a portion of the piston rod illustrating its calibration.

Like numerals of reference indicate the same parts throughout the several figures, in which—

1 indicates the liquid measuring apparatus, which includes a storage tank 2, which under usual conditions is buried under ground for the purpose of safety. 3 indicates the discharge pipe from the storage tank through which the liquid is drawn therefrom. 4 indicates a pump which in the accompanying drawing is illustrated as a rotary pump, although it is understood that any suitable pump or other lifting means may be employed for the purpose of lifting the liquid, such as gasolene, from the tank 2 by means of the pipe 3.

As shown in the drawing, a compound gearing 5 is employed, the same being driven manually by a crank 6, so as to rotate the pump 4 at sufficiently high speed to insure a proper lifting of the liquid through the pipe 3. The pump 4 discharges into the feed pipe 7 which is connected to a two-way valve 8, which pipe 7 passes to the measuring and dispensing tank 9, so that liquid from the storage tank 2 is pumped from the pump 4 through the pipe 7 and two-way valve 8 directly into the measuring and dispensing tank 9 in the manner as shown in the drawing.

Arranged within the measuring tank 9 and closely fitting therein is a piston 10 having a concaved upper face or surface 11 and being provided with a transverse opening 12 controlled by a float actuated valve 13. Connected to the piston 10 is a hollow piston rod 14 which passes through a stuffing box 15 on the tank 9, the bore 16 of the piston rod 14 communicating with the concaved face or surface 11 of the piston 10. The hollow piston rod 14 extends downwardly and enters loosely a casing 17 which is connected at its lower end to a two-way valve 18, which two-way valve 18 is in turn connected directly thereunder to a leak tank 19, while a return pipe 20 also connects the two-way valve 18 with the storage tank 2. Disposed in the casing or housing 17, adjacent the two-way valve 8 are two plungers 21 and disposed in the hollow piston rod 14 are two sets of depressions 22 and 23, said depressions in the piston rod 14 being arranged so as to receive the inner ends of the plungers 21.

Referring now to Fig. 2 it will be seen that a T-shaped handle 24 is provided for the two-way valve 8, while from Fig. 1 it will be seen that the handle 24 of the two-way valve 8 is connected to the handle 25 of the two-way valve 18 by a link 26. Referring to the several figures it will be seen that the T-shaped handle 24 is connected to the hollow piston rod 14 on opposite points of said rod by means of springs 27 connecting with pins 28 on the hollow piston rod 14, while it will be seen from Figs. 2 and 3 that the casing or housing 17 is provided on opposite sides with a slot 29 through which the said pins 28 on the piston rod 14 extend.

When it is desired to equip the apparatus with means for measuring a fractional part of the entire contents of the measuring tank 9, the piston rod 14 can be calibrated by arranging therein at proper predetermined intervals, a plurality of notches or recesses 30 and the housing or casing 17 can be equipped at its upper end with a plurality of pivoted dogs 31, each in line with a notch or recess 30 on the piston rod 14.

Connecting with the two-way valve 8 is the discharge pipe 32 which is arranged to form a trap 33 communicating with the leak tank 19, as shown in Fig. 1, a check valve 34 being provided between the leak tank 19 and the trap 33 to prevent the contents of the pipe 32 from passing into the leak tank 19 while the contents of the tank 19 are being dispensed through the pipe 32 and into the flexible dispensing hose 35, the trap 33 being provided to prevent liquid from flowing from the tank 9 by gravity.

Connected to the hollow piston rod 14 and movable therewith is a depending rack-bar 36 meshing with a pinion 37 loosely mounted on the shaft 38 of the pump operating crank 6, while a pawl 39 mounted on the pinion 37 engages a ratchet 40 rotatable with the shaft 38 of the crank 6 so that upon rotation of the crank 6 and shaft 38 clockwise, no rotary movement is imparted to the pinion 37 to move the rack-bar 36, while rotation of the crank 6 and shaft 38 contra-clockwise, causes the pinion 37 to be rotated to act upon and move the rack-bar 36.

Having thus described the several parts of the dispensing apparatus as shown in the accompanying drawing, its operation is as follows:

Upon rotation of the crank 6 clockwise, the pump 4 lifts liquid from the tank 2 and delivers same through the pipe 7 into the tank 9 under the piston 10. Air or gas entering the tank 9 under the piston 10 is relieved through the valve control opening 12 and the pressure of the liquid causes the piston to rise in the tank 9, the limit of the piston stroke being indicated in dotted lines in Fig. 1. When the piston 9 is in its lowermost position, as shown in full lines in Fig. 1, both of the locking plungers 21 are registered with their recesses or notches 22 in the hollow piston rod 14, and the T-shaped valve handle 24 of the two-way valve 8 is in position shown in Fig. 1, the same being in said position by reason of the downward pull of the springs 27, as shown in Fig. 1. As soon, however, as the piston 10 and its hollow piston rod 14 starts to move upward under the influence of liquid forced under the piston 10, the notches or recesses 22 in the piston rod 14 pass upwardly and out of contact with the inner ends of the plungers 21, forcing said plungers outwardly and into position shown in Fig. 3, wherein the lowermost plunger 21 is in engagement with the T-shaped handle 24 of the two-way valve 8, thus retaining the handle 24 of the valve 8 into its lowermost position, as shown in Figs. 1 and 3. While the handle of the valve 8 is in this position, direct communication is maintained between the pump 4 and the measuring tank 9 through the pipe 7, while communication between the discharge pipe 32 and the pipe 7 and tank 9 is cut-off by the valve 8. Under the influence of the liquid passing to the tank 9, the piston continues to rise and the springs 27 pass from position shown in Fig. 1 into position shown in full lines in Fig. 3, and as the piston 10 reaches the limit of its stroke, the notches or recesses 23 in the piston rod 14 register with the plungers 21, which plungers drop into the notches or recesses 23 under the influence of the plunger springs 41 which unlocks the handle 24 of the two-way valve 8 causing the springs 27, which have reached the position shown in dotted lines in Fig. 3, to throw the valve handle 24 into position shown in dotted lines in Fig. 3, thus automatically cutting-off communication between the pump 4 and the measuring tank 9, and opening communication between the tank 9 and the discharge pipe 32 by means of the two-way valve 8. The upward stroke of the piston 10 is thus automatically regulated and further liquid cannot be delivered from the storage tank 2 into the measuring tank 9. The tank 9 is now ready to dispense or discharge its contents and the crank 6 is now rotated contra-clockwise, which causes the rack-bar 36 to lower the piston 10 in the tank 9, and as said piston is lowered the contents of the tank 9 are discharged through the two-way valve 8 and through the discharge pipe 32 through the trap 33 into the dispensing hose 35. On the downward stroke of the piston 10, the notches 23 in the piston rod 14 pass out of engagement with the plungers 21, the uppermost plunger of which engages the handle 24 of the two-way valve 8 and locks said handle in its uppermost position, as shown in dotted lines in Fig. 3, thus maintaining communication between the tank 9 and the discharge pipe 32. As the piston 10 nears the limit of its downward stroke, the springs 9 on the valve handle 24 are carried down by the piston rod 14 so as to exert a strong downward pull on the two-way valve 8, and as said piston 10 reaches the downward limit of its stroke and has dispensed its entire contents, the plungers 21 drop into the notches 22 in the piston rod 14, thus unlocking the valve handle 24 out of its raised position and causing the springs 27 to throw the valve handle 24 into its lowermost position, as shown in Fig. 1, thus instantly cutting-off communication between the measuring tank 9 and the discharge pipe 32 and simultaneously effecting communication between the pump 4 and the measuring tank 9. It will thus be seen that communication between the pump 4, storage tank 2 and the measuring tank 9 cannot be effected until the piston 10 has discharged or dispensed the entire contents of the tank 9 and that short stroking of the piston 10 is effectually prevented. When, however, the piston 10 has reached the limit of its downward stroke and has dispensed the entire contents of the tank 9, communication between the pump 4 and the tank 9 is automatically effected as just described, so that rotation of the crank 6, clockwise, again forces liquid into the tank 9 and under the piston 10 to again raise the piston 10 and refill the tank 9.

Having thus described the action of the apparatus, as far as the filling of the measuring tank 9 and dispensing its contents, leakage past the piston 10 is taken care of in the following manner:

The valve handle 24 of the two-way valve 8 being linked to the valve handle 25 of the two-way valve 18, the said two-way valve 18 is thrown or operated simultaneously with the two-way valve 8. While the liquid from the storage tank 2 is being forced to the measuring tank 9 and the piston 10 is passing through its upward stroke, the handle 25 of the two-way valve 18 is in position shown in Fig. 1 and opens communication between the housing or casing 17 and the return pipe 20 leading to the storage tank 2. Any leakage, therefore, past the piston 10 during its upward stroke runs down through the hollow piston rod 14 and through the two-way valve 18 into the return pipe 20 and into the storage tank 2, thus the leakage of the apparatus during the filling stroke of the piston 10 passes back to the operator or vender of the liquid. As soon, however, as the piston 10 has reached the limit of its upward stroke, the valve 18 is thrown simultaneously with the valve 8 and communication between the casing or housing 17 and the return pipe 20 is cut-off, while communication is simultaneously effected between the casing or housing 17 and the leak tank 19. Thus on the downward or dispensing stroke of the piston 10 leakage past the piston 10, which it will be understood is from the contents of the tank 9, passes down through the hollow piston rod 14 through the two-way valve 18 and into the leak tank 19 and thence from the leak tank 19 into the discharge or dispensing pipe 32. It will thus be seen that upon the downward stroke or dispensing stroke of the piston 10, any leakage past the piston 10 is delivered to the purchaser, so that he receives the full and entire contents of the measuring tank 9, irrespective of the leaky condition of the piston 10.

From the foregoing it will be seen that the limit of the stroke of the piston 10 is beyond the control of the vender or purchaser of the apparatus. It will also be seen that it is impossible to dispense liquid from the measuring tank until the measuring tank has received its full and predetermined quantity of liquid, and it will further be seen that it is impossible to force liquid again to the measuring tank 9 until it has first dispensed its entire contents, for the reason that should the pump be operated in the direction or for the purpose of forcing liquid to the measuring tank 9 before the piston 10 has reached the limit of its downward stroke, the effect would be simply of forcing the liquid against the two-way valve 8 where it could go no farther. On the other hand if it were attempted to dispense liquid from the tank 9 before it has received its predetermined quantity and before the piston 10 has reached the limit of its upward stroke the effect would be to discharge from the tank 9 directly through the pump 4, back into the storage tank 2.

Having thus fully described the invention, it is apparent that the apparatus shown in the accompanying drawing and described in the foregoing specification, is susceptible to changes, alterations and variations in the design, construction and arrangement of the parts, and I consider myself clearly entitled to all such changes, modifications and variations as fall within the limit and scope of the appended claims.

What I claim as new and desire to secure by Letters Patent of the United States, is—

1. A liquid measuring apparatus, including in combination with a storage tank, a measuring and dispensing tank, a piston in said measuring and dispensing tank, means for forcing liquid from the storage tank to the measuring and dispensing tank, a dispensing pipe, means for alternately effecting communication between the storage tank and the measuring and dispensing tank and between the dispensing pipe and the measuring and dispensing tank, a hollow piston rod for said piston, means actuated by said hollow piston rod for controlling the position of said second mentioned means, means for alternately effecting communication between the interior of the hollow piston rod and the storage tank and between the hollow piston rod and the said dispensing pipe and means for lowering the said piston to dispense the contents of the measuring and dispensing tank.

2. A liquid measuring apparatus including a storage tank, a measuring and dispensing tank, a piston in the measuring and dispensing tank, means for effecting communication between the storage tank and the measuring and dispensing tank, a dispensing pipe, means for alternately effecting communication between the measuring and dispensing tank and the storage tank and between the measuring and dispensing tank and the dispensing pipe, a hollow piston rod for said piston, means controlled by the position of the said piston for controlling the position of the second mentioned means and means for alternately effecting communication between the interior of the hollow piston rod and the storage tank and between the hollow piston rod and the said dispensing pipe.

3. A liquid measuring apparatus including a storage tank, a measuring and dispensing tank, a connection between the storage tank and the measuring and dispensing tank, a piston in the measuring and dispensing tank, means for forcing liquid from the storage tank to the measuring and dispensing tank at a point under the piston to raise the same and means controlled by the position of the said piston in the measuring and dispensing tank for opening and closing communication between the measuring and dispensing tank and the storage tank and a dispensing pipe for dispensing liquid from the measuring and dispensing tank.

4. A liquid measuring apparatus including a storage tank, a measuring and dispensing tank connected therewith to receive liquid therefrom, a piston in the measuring and dispensing tank, a dispensing pipe, means controlled by the position of the said piston for effecting communication between the said dispensing tank and the storage tank and between the said dispensing tank and the dispensing pipe, means for controlling the flow of leakage from the dispensing tank alternately to the storage tank and to the dispensing pipe.

5. A liquid measuring apparatus including a storage tank, a measuring and dispensing tank in communication with the storage tank, a piston in the measuring and dispensing tank for alternately effecting communication between the dispensing tank and the storage tank and between the dispensing tank and the dispensing pipe and means for controlling the direction of the flow of leakage past the piston in the said measuring and dispensing tank.

6. A liquid measuring apparatus including a storage tank, a measuring and dispensing tank in communication with the storage tank to receive liquid therefrom, a piston in said measuring and dispensing tank a dispensing pipe for dispensing liquid from the dispensing tank and means controlled by the position of the piston in the dispensing tank for controlling the flow of leakage past the piston in the dispensing tank alternately to the storage tank and dispensing pipe.

7. A liquid measuring apparatus including a dispensing tank, a piston therein, means controlled by the position of the piston for controlling the direction of the flow of liquid passing to and from the dispensing tank and means controlled by the position of the piston in the dispensing tank for controlling the direction of flow of leakage past the piston in the dispensing tank.

8. A liquid measuring apparatus including a dispensing tank, a piston therein, said dispensing tank being arranged to receive liquid to be dispensed, means controlled by the position of the piston in the dispensing tank for regulating the quantity of liquid passing thereto and for regulating the quantity of liquid passing therefrom and means for controlling the direction of flow of the leakage past the piston in the dispensing tank.

9. A liquid measuring apparatus including a dispensing tank, a piston therein, means for automatically controlling the quantity of liquid passing to the dispensing tank and for automatically controlling the quantity of liquid discharged from the dispensing tank, and means for automatically controlling the direction of flow of leakage past the piston in the dispensing tank.

10. A liquid measuring apparatus including a dispensing tank, means for automatically controlling the quantity of liquid passing to the dispensing tank and for automatically controlling the quantity of liquid discharged from the dispensing tank and means for automatically controlling the direction of flow of the leakage from the dispensing tank.

11. A liquid measuring apparatus including a dispensing tank to receive dispensed liquid, means for automatically controlling the quantity of liquid passing to the dispensing tank and means for automatically controlling the direction of flow of leakage from the dispensing tank.

12. A liquid measuring apparatus including a dispensing tank, a piston movable therein and actuated by the pressure of liquid entering the dispensing tank, means controlled by the stroke of the piston in the dispensing tank for controlling the quantity of liquid passing to the dispensing tank, a dispensing pipe and means for controlling the direction of liquid past the piston in the dispensing tank.

In testimony whereof I affix my signature in presence of two witnesses.

CHARLES HUGH DUFFY.

In presence of—
T. P. BRITT,
MINETTE A. BERGMANN.